US012226358B2

(12) United States Patent
Curry

(10) Patent No.: US 12,226,358 B2
(45) **Date of Patent: *Feb. 18, 2025**

(54) PROGRAMMABLE MULTI-THERAPY INVERSION TABLE

(71) Applicant: Marcus Curry, San Diego, CA (US)

(72) Inventor: Marcus Curry, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/419,507

(22) Filed: Jan. 22, 2024

(65) Prior Publication Data

US 2024/0180768 A1 Jun. 6, 2024

Related U.S. Application Data

(63) Continuation of application No. 17/179,300, filed on Feb. 18, 2021, now Pat. No. 11,877,972.

(51) Int. Cl.
*A61H 1/02* (2006.01)
*A61G 13/00* (2006.01)
(Continued)

(52) U.S. Cl.
CPC ......... *A61H 1/0229* (2013.01); *A61G 13/009* (2013.01); *A61G 13/08* (2013.01);
(Continued)

(58) Field of Classification Search
CPC .... A61H 1/005; A61H 1/0229; A61H 1/0237; A61H 1/0296; A61H 23/00;
(Continued)

(56) References Cited

U.S. PATENT DOCUMENTS 7,160,261 B1 1/2007 Huang
7,575,541 B2 8/2009 Chen
(Continued)

FOREIGN PATENT DOCUMENTS

KR 100380816 4/2003
WO 2013054992 A1 4/2013
(Continued)

OTHER PUBLICATIONS

International Search Report and Written Opinion issued in PCT/US22/16708 on Jun. 1, 2022 (10 pages).
(Continued)

*Primary Examiner* — Justine R Yu
*Assistant Examiner* — Matthew R Moon
(74) *Attorney, Agent, or Firm* — ARC IP Law, PC; Joseph J. Mayo

(57) ABSTRACT

An inversion table that incorporates additional therapies, such as massage, traction, and heat. Therapeutic elements of the inversion table may be programmable, so that settings are cycled automatically through preprogrammed patterns. The table may have one or more back massage elements that travel along tracks in the table to massage different portions of the back, and similar neck massage elements that massage different portions of the neck. Traction actuators may apply traction forces to the head and the legs. One or more heating pads may apply heat to any portion of the body. Settings for the therapeutic elements may be controlled by a processor that may execute stored therapy programs, or may respond to user input from a controller or a smartphone.

17 Claims, 8 Drawing Sheets

(51) Int. Cl.
*A61G 13/08* (2006.01)
*A61G 13/12* (2006.01)
*A61H 23/00* (2006.01)

(52) U.S. Cl.
CPC ......... *A61G 13/121* (2013.01); *A61H 1/0237* (2013.01); *A61H 1/0296* (2013.01); *A61H 23/00* (2013.01); *A61G 2203/10* (2013.01); *A61G 2210/90* (2013.01); *A61H 2201/0207* (2013.01); *A61H 2201/1611* (2013.01); *A61H 2201/1623* (2013.01); *A61H 2201/1642* (2013.01); *A61H 2201/1669* (2013.01); *A61H 2201/5002* (2013.01); *A61H 2201/5007* (2013.01); *A61H 2203/0456* (2013.01); *A61H 2205/086* (2013.01)

(58) Field of Classification Search
CPC .... A61H 2201/0207; A61H 2201/1611; A61H 2201/1623; A61H 2201/1642; A61H 2201/1669; A61H 2201/5002; A61H 2201/5007; A61H 2201/5038; A61H 2203/0456; A61H 2205/086; A61H 2201/5046; A61H 2201/0142; A61H 1/0222; A61H 2201/1607; A61H 2201/1609; A61H 2201/1628; A61H 2201/1671; A61H 2201/5097; A61H 2203/0493; A61G 13/009; A61G 13/08; A61G 13/121; A61G 2203/10; A61G 2210/90
See application file for complete search history.

(56) References Cited

U.S. PATENT DOCUMENTS

| | | | |
|---|---|---|---|
| 8,512,265 B2 | 8/2013 | Lev et al. | |
| 11,877,972 B2 * | 1/2024 | Curry | A61H 1/0296 |
| 2006/0040812 A1 | 2/2006 | Teeter | |
| 2008/0262398 A1 | 10/2008 | Ferber et al. | |
| 2011/0087139 A1 | 4/2011 | Ferber et al. | |
| 2013/0059706 A1 | 3/2013 | Leier et al. | |

FOREIGN PATENT DOCUMENTS

| | | |
|---|---|---|
| WO | 2017/050437 | 3/2017 |
| WO | 2017/050437 A1 | 3/2017 |

OTHER PUBLICATIONS

International Preliminary Report on Patentability issued in PCT/US2022/016708 on Aug. 31, 2023 (9 pages.

Supplementary European Search Report and Written Opinion issued in PCT/US2022016708, dated Nov. 12, 2024, and English translations thereof.

* cited by examiner

PROGRAMMABLE MULTI-THERAPY INVERSION TABLE

This patent application is a continuation of U.S. Utility patent application Ser. No. 17/179,300, filed 18 Feb. 2021, the specification of which is hereby incorporated herein by reference.

BACKGROUND OF THE INVENTION

Field of the Invention

One or more embodiments of the invention are related to the field of physical therapy devices. More particularly, but not by way of limitation, one or more embodiments of the invention enable a programmable multi-therapy inversion table.

Description of the Related Art

Inversion tables for spinal decompression are known in the art. Generally these tables are simple mechanical devices that a user manually rotates to position the head lower than the legs in order to stretch the spine. While these devices can be effective, some patients benefit from other kinds of therapies such as traction, massage, or heat. Some devices have added heating pads to inversion tables, but full integration of a wider range of therapies into a single inversion table has not been performed.

An additional limitation of most existing inversion tables is that they are either manually positioned by the user, or if they support electronic control then the user must enter specific settings (for example for the tilt angle of the table). In some situations, users may benefit from time-varying settings that are cycled automatically, which could be accomplished with a programmable inversion table.

For at least the limitations described above there is a need for a programmable multi-therapy inversion table.

BRIEF SUMMARY OF THE INVENTION

One or more embodiments described in the specification are related to a programmable multi-therapy inversion table. Embodiments of the invention may incorporate multiple therapeutic elements into an inversion table and may programmatically control the settings of these elements to execute sequences of therapies.

One or more embodiments of the invention may include a supporting frame, a back rest, and one or more moving back massage elements coupled to the back rest. The back rest may be coupled to the frame so that it can rotate between an upright position with the superior end (closest to the head) vertically higher than the inferior end (closest to the feet), and an inverted position with the superior end vertically lower than the inferior end. The one or more moving back massage elements may each have a back vibrating element that applies vibration to the user's back, and a back massage element position actuator that moves the vibrating element along a track in or coupled to the back rest, in order to position the vibrating element at multiple locations of the user's back.

One or more embodiments of the invention may also have a table tilt actuator that moves the back rest between its upright and inverted positions.

In one or more embodiments, the track along which a back massage element moves may be a slot in the back rest; it may for example extend from a first position closest to the superior end of the back rest to a second position closest to the inferior end.

One or more embodiments may have two moving back massage elements that move in parallel tracks.

In one or more embodiments, each moving back massage element may also be configured to rotate the back vibrating element.

One or more embodiments may include a head and neck support coupled to the back rest. It may include a neck traction actuator that moves the head and neck support away from the back rest.

In one or more embodiments, one or more moving neck massage elements may be coupled to the head and neck support. Each neck massage element may have a neck vibrating element that applies vibration to the user's neck, and a neck massage position actuator that moves the vibrating element along a track in or coupled to the head and neck support, in order to position the vibrating element at multiple locations of the user's neck.

In one or more embodiments, the track associated with a moving neck massage element may be a slot in the head and neck support. The track may extend from a first position closest to the superior end of the head and neck support to a second position closest to the inferior end.

One or more embodiments may have two moving neck massage elements that may move in parallel tracks.

In one or more embodiments, the moving neck massage elements may be further configured to rotate the neck vibrating elements.

One or more embodiments may include a leg support coupled to the back rest. It may include a leg traction actuator that moves the leg support away from the back rest.

One or more embodiments may include a heating pad coupled to the back rest.

One or more embodiments may include a processor that is configured to set or modify one or more of the settings of any of the elements of the inversion table, such as the back rest, the table tilt actuator, the moving back massage element or elements, the moving neck massage element or elements, the neck traction actuator, the leg traction actuator, or the heating pad or pads. One or more embodiments may include a stored program that executes on the processor and that sets or modifies one or more of these settings.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION OF THE INVENTION

A programmable multi-therapy inversion table will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
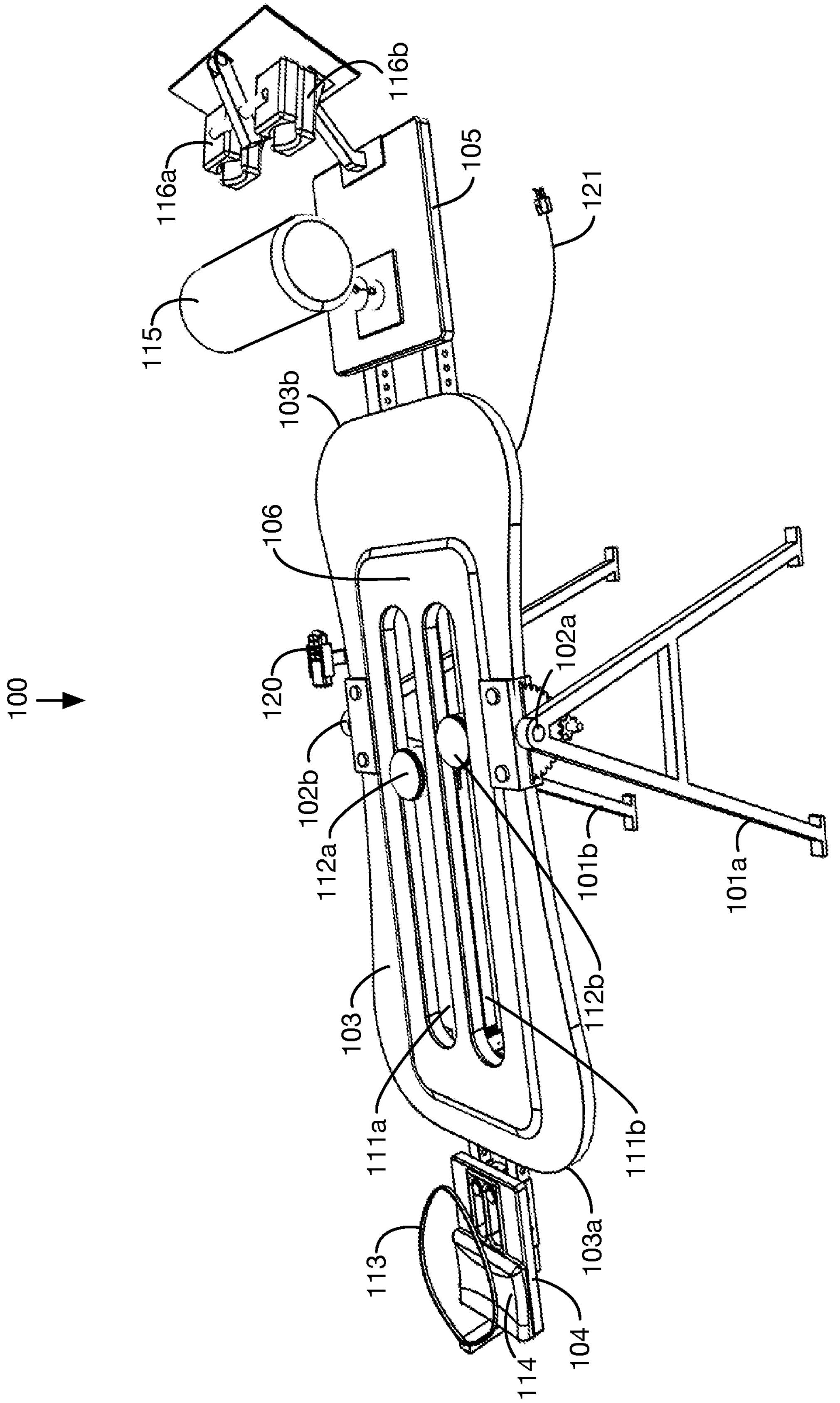
FIG. 1 shows an illustrative embodiment of an inversion table that incorporates additional therapies such as back and neck massage, neck and leg traction, and heat.

FIG. 1 shows an illustrative embodiment of the invention, viewed from above. This embodiment is an inversion table that incorporates additional therapeutic elements, such as for example, without limitation, any or all of massage, traction, and heat. The illustrative inversion table 100 has a support frame that includes two A-frames 101*a* and 101*b*, and a back rest 103 that is coupled to the frame at pivots 102*a* and 102*b*. Back rest 103 has a superior end 103*a*, which is toward the head of a user who lies on the back rest, and an inferior end 103*b*, which is toward the legs of the user. The pivots allow the inversion table to rotate so that a user may for example start with the legs below the head (so that superior end 103*a* is vertically higher than inferior end 103*b*), and then invert the table so that the head is lower than the legs (with superior end 103*a* lower than inferior end 103*b*). Inversion table 100 also has one or more back massage elements that are integrated into or coupled to the back rest 103. The embodiment shown in FIG. 1 has two back massage elements 112*a* and 112*b*. One or more embodiments may have any number of back massage elements. In illustrative inversion table 100, the massage elements 112*a* and 112*b* travel along tracks 111*a* and 111*b*, respectively, to provide massage to different portions of a user's back at different times. In this embodiment, the tracks are parallel and run along the axis from the superior end 103*a* to the inferior end 103*b*. This orientation and arrangement of the tracks is illustrative; in one or more embodiments the track or tracks along which a back massage element moves may be in any locations and orientations, and of any lengths and shapes. Tracks 111*a* and 111*b* include slots in back rest 103 into which the elements 112*a* and 112*b* fit. In one or more embodiments, the back rest may not have slots; instead, for example, the tracks for massage elements may be added to a solid back rest. Back massage elements 112*a* and 112*b* may for example have vibrating elements that vibrate or press against the user's back, or they may move in any manner or manners to provide any type of massage. For example, without limitation, elements 112*a* and 112*b* may vibrate, twist, pulse, inflate and deflate, press and release; they may move up and down, sideways, toward or away from the user's back, or in any direction or directions. In one or more embodiments, massaging elements 112*a* and 112*b* may move in multiple modes; for example they may vibrate, twist, and move along tracks 111*a* and 111*b*.

Illustrative inversion table 100 has a head and neck support 104 attached to the superior end 103*a* of back rest 103, and a leg support 105 attached to the inferior end 103*b* of back rest 103. Head and neck support 104 has a head rest 114 and a chin strap or other head support or brace 113; and leg support 105 has a knee pad 115 and ankle clamps or other foot braces or supports 116*a* and 116*b*. These supports may also incorporate additional therapies in one or more embodiments. For example, the supports may be coupled to the back rest via actuators that apply traction. Traction actuators may be located on the back rest or on the head and neck or leg supports. Force may be applied for example to head and neck support 104 to push it in the superior direction, thereby applying traction to the user's neck as chin strap 113 pulls the head away from the back. In one or more embodiments, chin strap 113 may be any brace, strap, or pad that can contact a portion of the user's head to apply a neck traction force. Force may be applied for example to leg support 105 to push it in the inferior direction, thereby applying traction to the user's legs or lower back as ankle clamps 116*a* and 116*b* or similar braces pull the feet away from the back. In one or more embodiments, traction may be applied to any body part in any direction.

One or more embodiments may incorporate one or more heating pads or other temperature control elements into any part of the inversion table. For example, inversion table 100 may have a heating pad 106 that covers all or a portion of back rest 103. Heating pads may also be incorporated for example into either or both of the head and neck support 104 and the leg support 105. In one or more embodiments, one or more vibrating elements may also provide heat. The temperature or heat output of any of the heating elements may be controllable.

Inversion table 100 may for example be powered via an electrical connection 121, or via a battery. It may include one or more user control devices such as device 120, which may for example allow the user to modify the settings of any of the therapy elements of the inversion table.

Figure 2:
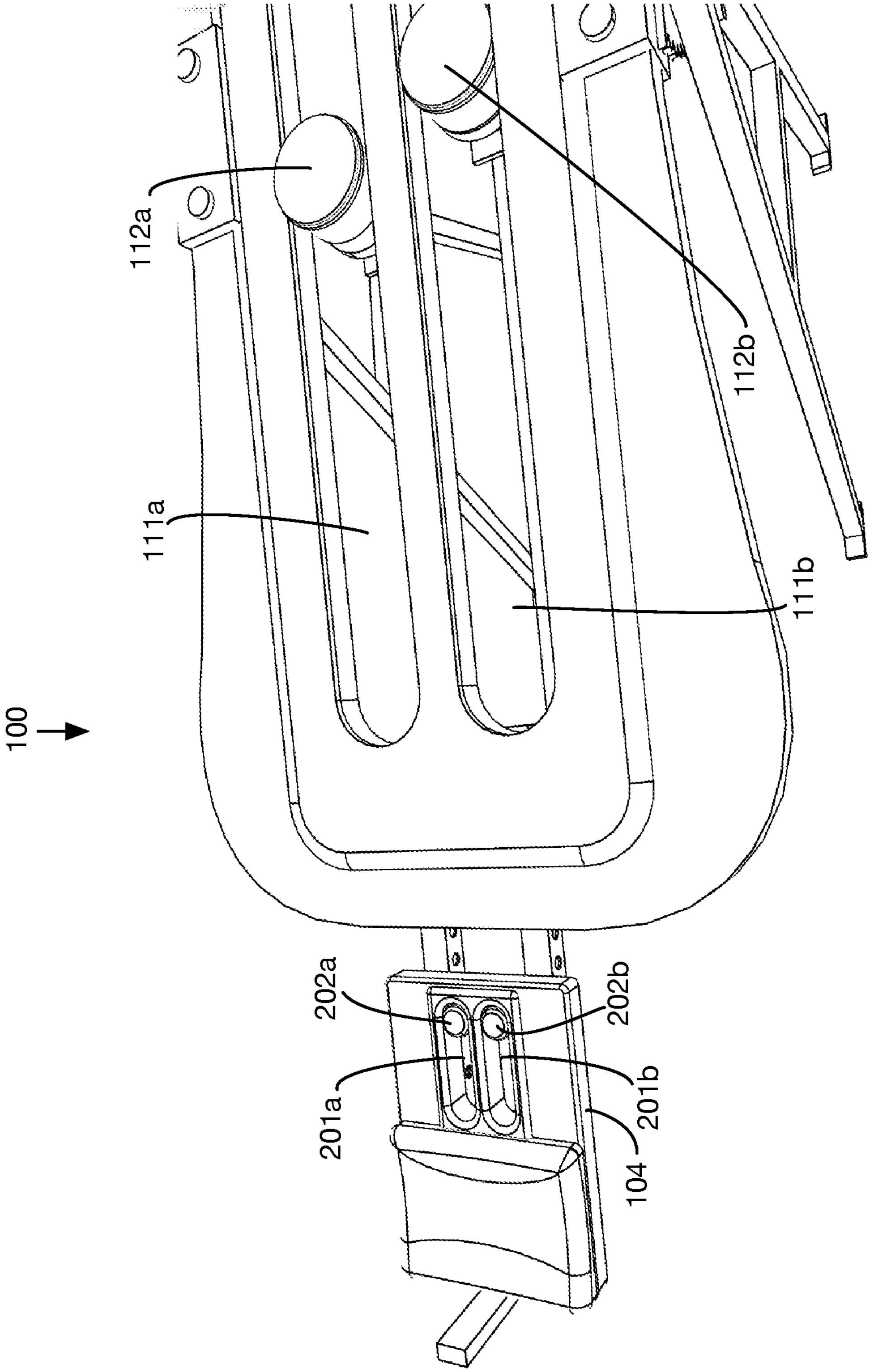
FIG. 2 shows a closeup view of the neck massage elements of the embodiment of FIG. 1.

In one or more embodiments, head and neck support 104 may incorporate one or more massage elements to massage for example the neck or the back of the head. FIG. 2 shows a closeup view of the head and neck support element 104 of the inversion table 100 to show illustrative neck massage elements. In this embodiment, these neck massage elements are similar to the back massage elements 112*a* and 112*b*, but they are smaller in order to focus on the smaller area of the neck. For example, massage elements 202*a* and 202*b* may travel in tracks 201*a* and 201*b*, respectively, so that different portions of the neck may be massaged. One or more embodiments may use any number of neck massage elements, and the track or tracks may have any positions, orientations, lengths, or shapes. In the embodiment shown in FIG. 2, the tracks 201*a* and 201*b* run from along the superior-to-inferior axis, like the tracks 111*a* and 111*b* for the back massage elements. Tracks 201*a* and 201*b* may be for example slots in the neck support into which the neck massage elements fit. Like the back massage elements, the neck massage elements may vibrate, twist, pulse, inflate and deflate, press and release, move up and down, sideways, toward or away from the user's neck, or in any direction or directions. In one or more embodiments, massaging elements 202*a* and 202*b* may move in multiple modes; for example they may vibrate, twist, and move along tracks 201*a* and 201*b*.

The components of the inversion table may be constructed of any desired materials. For example, the back rest may be made of polyurethane.

Figure 2A:
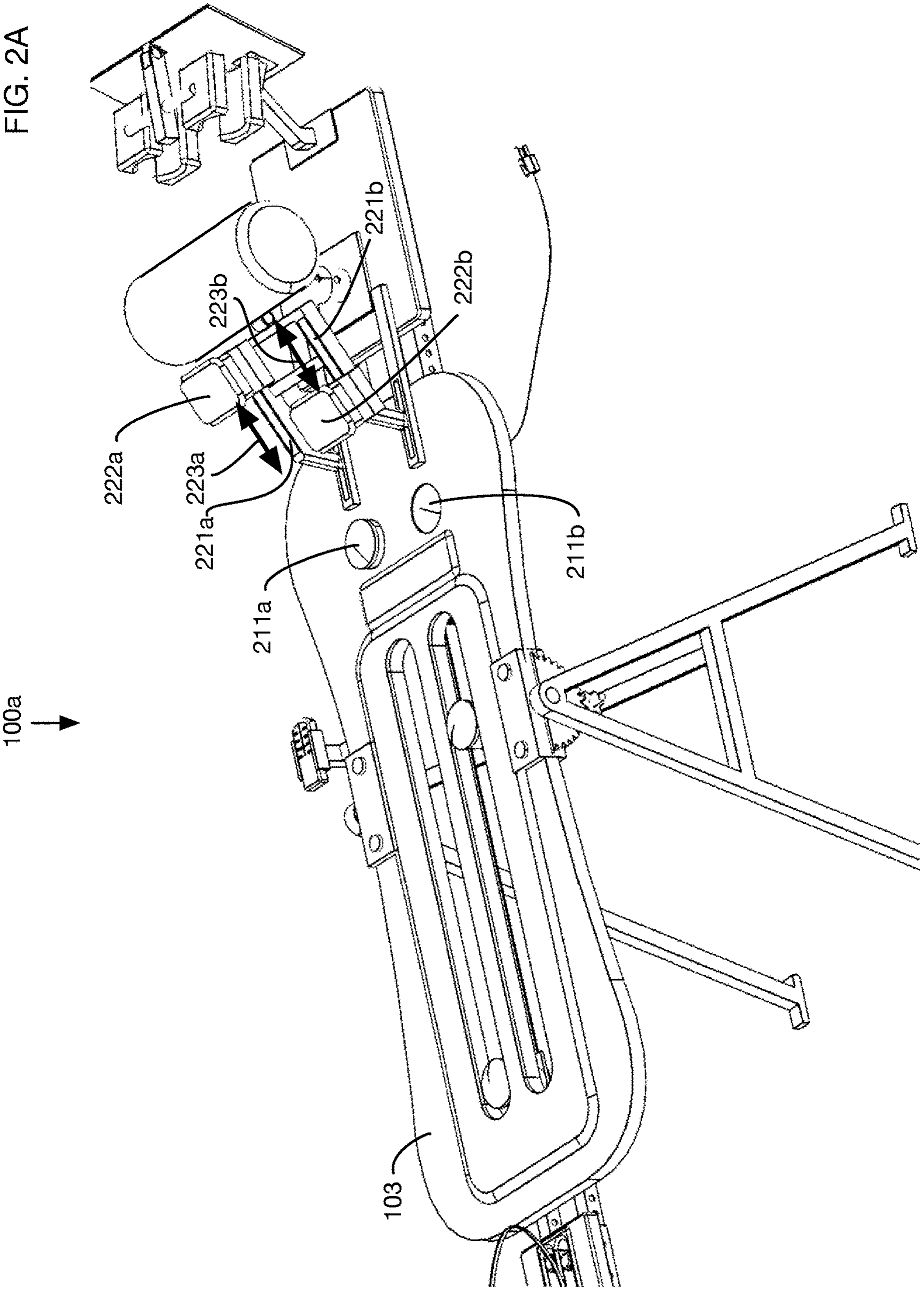
FIG. 2A shows a variation of the inversion table of FIG. 1 that has additional gluteal and hamstring vibrating massage elements.
Figure 2B:
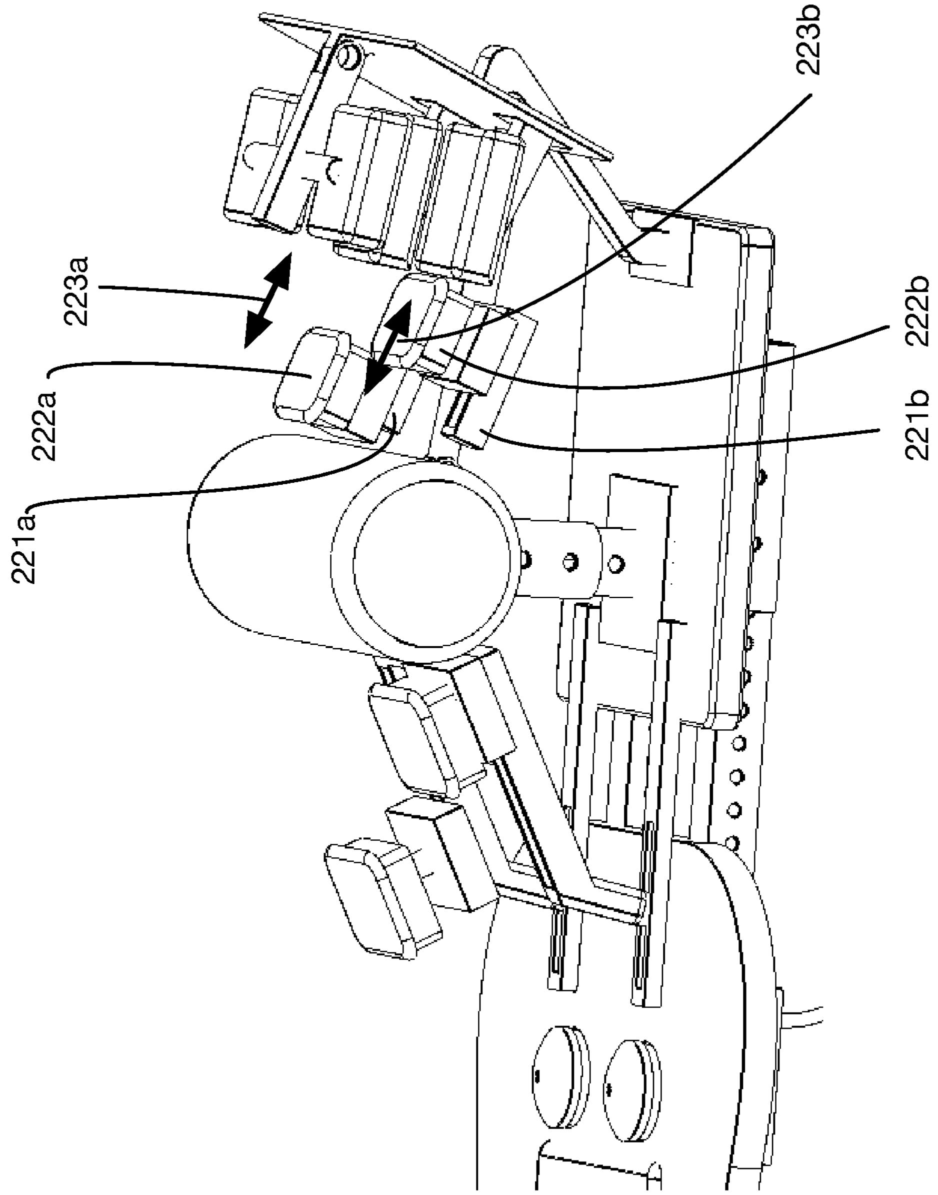
FIG. 2B shows a variation of the inversion table of FIG. 1 that has additional calf vibrating massage elements.
Figure 4:
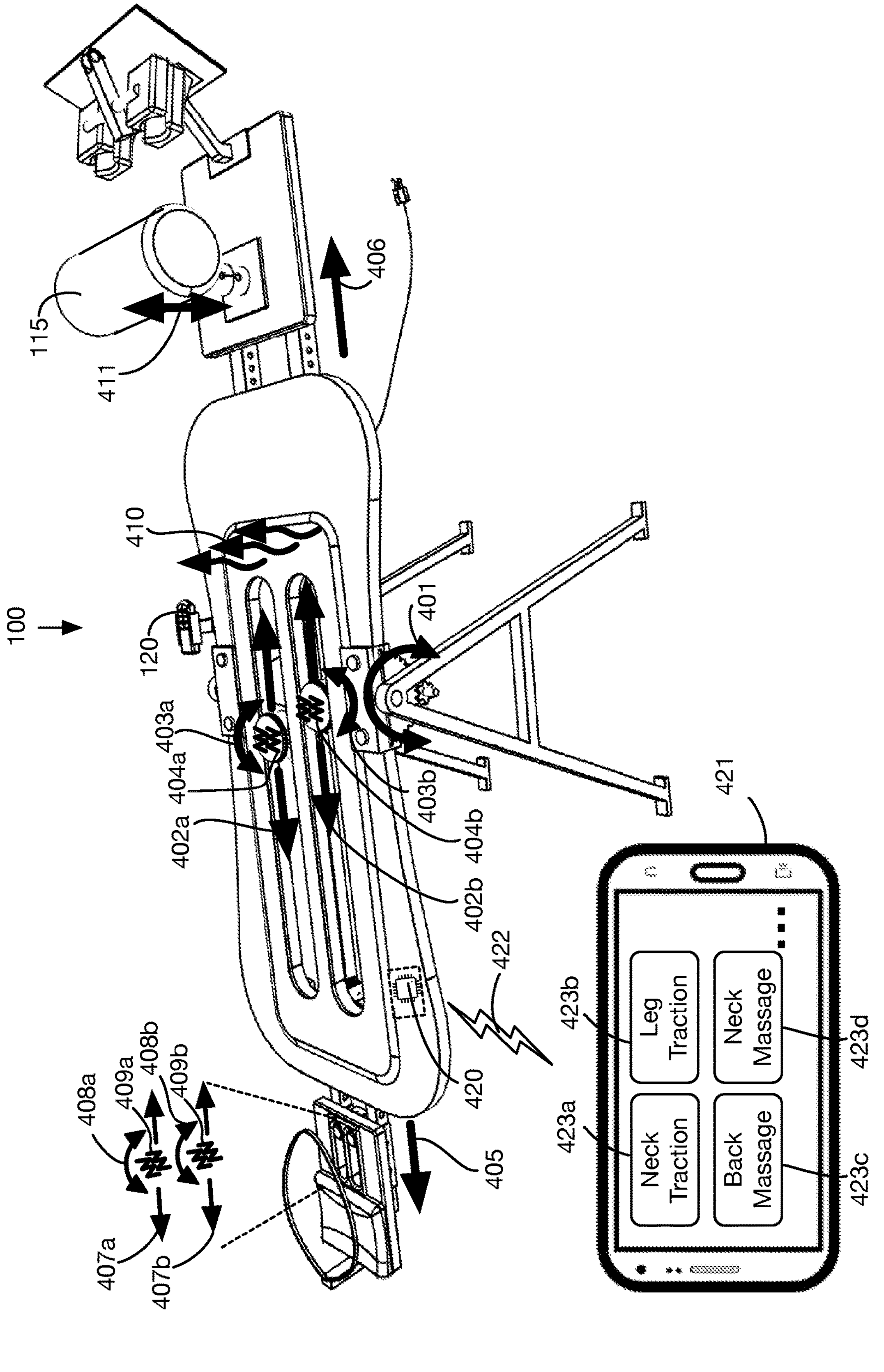
FIG. 4 shows illustrative actuation degrees of freedom for the therapies provided by the embodiment of FIG. 1.

One or more embodiments may incorporate leg massage elements into the leg support 105. More generally, embodiments may incorporate any number of massage elements positioned at any location in the inversion table, to target any desired portion or portions of the user's body. These massage elements may be stationary, or they may move. For example, FIG. 2A shows an illustrative inversion table 100*a* with left and right gluteal massage elements 211*a* and 211*b*, respectively, integrated into the inferior end of the back rest 103. This embodiment also has left and right hamstring massage elements 222*a* and 222*b*, which may move in tracks 221*a* and 221*b*, respectively to massage different portions of the user's hamstrings. For example, left hamstring massage element 222*a* may move up and down in directions 223*a* along track 221*a*, and right hamstring massage element 222*b* may move up and down in directions 223*b* along track 221*b*. Like the other massage elements of table 100, any or all of these massage elements 211*a*, 211*b*, 222*a*, and 222*b* may vibrate, twist, pulse, inflate and deflate, press and release, move up and down, sideways, toward or away from any part of the user's body, or in any direction or directions. These massage elements, and all others, may also provide heating, cooling, or any other desired therapy. In addition, all massage elements may pitch or roll or yaw. Pitch relates to the axis orthogonal to the spine of the user, roll relates to the axis parallel to the spine and yaw relates to the axis orthogonal to the plane that defines the pitch and roll axes. For example, based on the differing anatomy of the gluteal muscles and angle that the muscles approach the lower back, percussion elements 211*a* and 211*b* may be manually or programmatically adjusted in pitch about an axis orthogonal to the spine, (parallel to tilt angle 401 as shown in FIG. 4). In one or more embodiments, all massage elements including 211*a* and 211*b* be adjusted in pitch or roll or yaw before treatment or during treatment, i.e., be statically adjusted or dynamically adjusted over time in pitch or roll or yaw. In addition, the hamstring assembly can be added on the other side of knee rest 115 and between knee rest 115 and foot braces or supports 116*a* and 116*b* to provide percussion to the calves as shown in FIG. 2B. Such an arrangement allows for both the hamstrings and calves to be engaged in an embodiment equipped with two such arrangements. In one or more embodiments, the massage elements on the calf side may be made the same size, or smaller, e.g., 20% smaller for calf percussion as added to the other side of knee rest 115 with appropriate bracing.

Figures 3A, 3B:
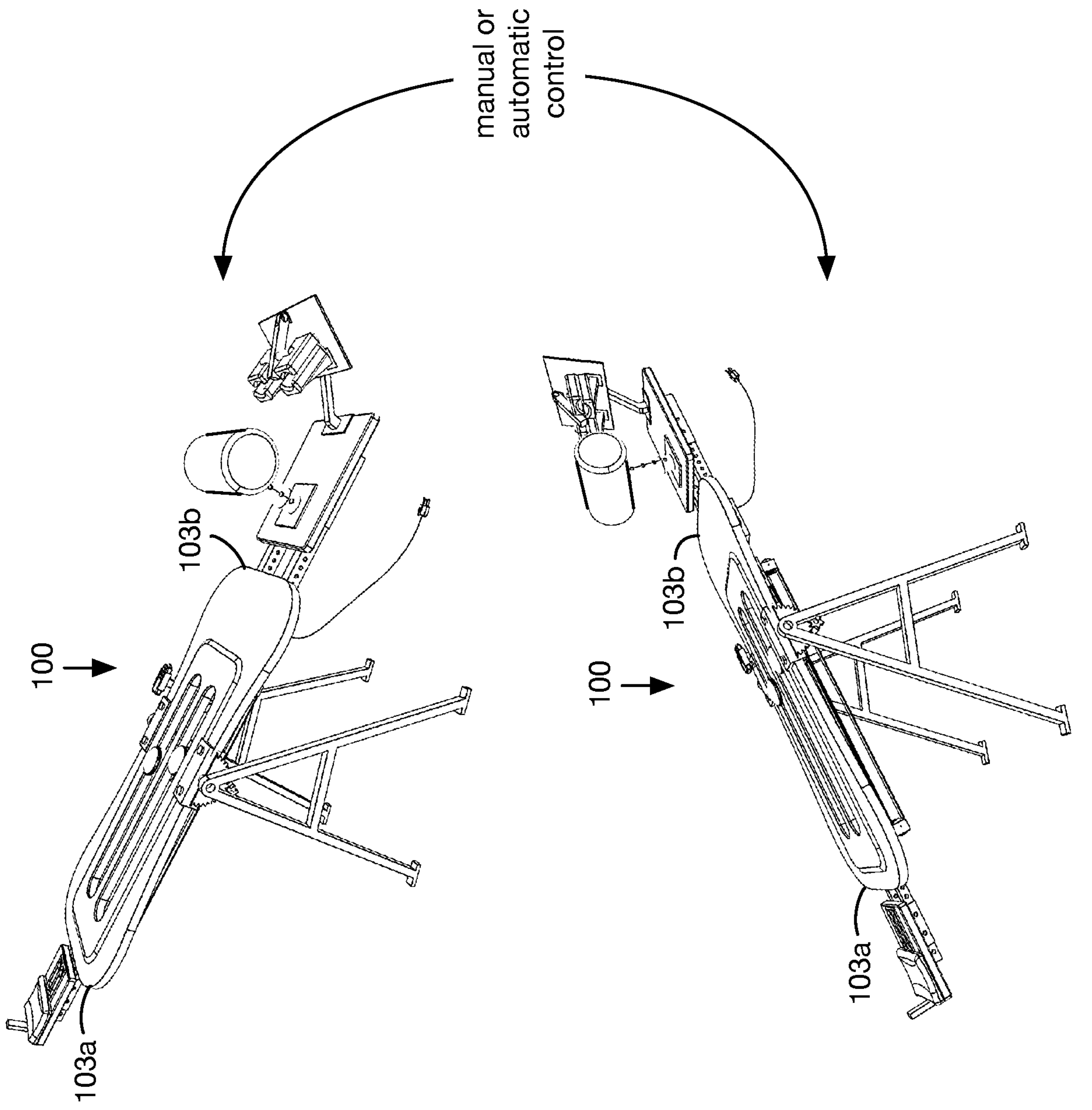
FIGS. 3A and 3B show the embodiment of FIG. 1 in the upright and inverted positions, respectively.

FIGS. 3A and 3B show upright and inverted positions, respectively, of the inversion table. In the upright position, the superior end 103*a* of the back rest is vertically higher than the inferior end 103*b*; this is reversed in the inverted position. In one or more embodiments the user may manually command the inversion table to move from the upright to the inverted position or vice-versa, and may select the amount of inversion angle. In addition, in one or more embodiments the inversion table may automatically move the user between upright and inverted positions, possibly multiple times, using a programmable sequence of positions. This programmable control is described further below with respect to FIG. 6.

FIG. 4 shows potential degrees of freedom for illustrative therapy elements of inversion table 100. Controls and settings may be associated with any or all of these degrees of freedom. For example, right and left back massage elements may move along the superior-inferior axis in directions 402*a* and 402*b* (up and down within their associated tracks); they may rotate or twist back and forth along rotation paths 403*a* and 403*b*, and they may vibrate in modes 404*a* and 404*b*. The position, speed, and intensity of any of these motions may be controllable or programmable. Similar degrees of freedom may be available for right and left neck massage elements, such as up and down movements 407*a* and 407*b*, rotational movements 408*a* and 408*b*, and vibration modes 409*a* and 409*b*. The tilt angle 401 of the inversion table may be varied using manual or automatic control. Neck traction force 405 and leg traction force 406 may be controllable or programmable. An actuator may move the position of knee rest 115 up or down along path 411. For embodiments equipped with one or more heating pads, the temperature or heat output 410 may be controllable or programmable. Similar degrees of freedom may be available for the massage elements 211*a*, 211*b*, 222*a*, and 222*b* of embodiment 100*a* shown in FIG. 2A.

In one or more embodiments, the inversion table may include or communicate with one or more processors that control the actuators to achieve the desired settings or sequences of settings for the degrees of freedom of the inversion table. For example, a microprocessor 420 may be integrated into the inversion table and connected electrically or wirelessly to the actuators. One or more embodiments may use any type or types of processors for control, including for example, without limitation, a microprocessor, a microcontroller, a customized circuit, an ASIC, a CPU, a GPU, a laptop or desktop or tablet computer, a server, a mobile device, a smart phone, a smart watch, or a network of any of these devices.

In one or more embodiments, the user of the inversion table, or a therapist or assistant, may be able to control some or all of the settings associated with these degrees of freedom. For example, the inversion table may include a controller 120 with buttons or switches to select or modify settings; this controller may communicate with processor 420. In one or more embodiments, a user may use an external device such as a smartphone 421 that executes an application that presents controls to the user, and this device may for example communicate over a wireless channel 422 with processor 420. Any types of controls may be presented to the user; for example, a user may use top-level controls such as buttons 423*a* through 423*d* to bring up submenus or detail screens for control of individual therapy elements.

Figure 5:
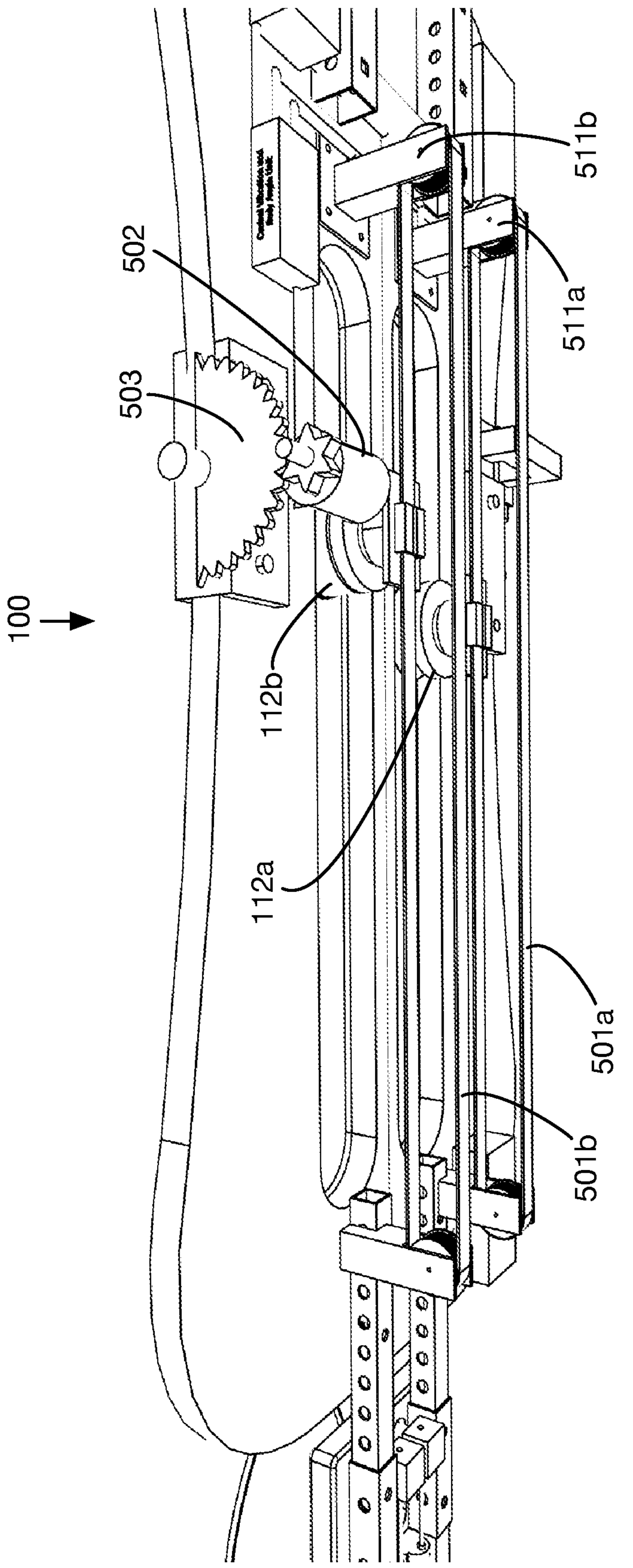
FIG. 5 shows a bottom view of the embodiment of FIG. 1, illustrating a belt drive mechanism that actuates the back massage elements, and a motor that drives the table tilt angle.

Embodiments may use any type or types of actuators to achieve the desired output and settings of the therapy elements. FIG. 5 shows for example illustrative actuators to position back massage elements 112*a* and 112*b* along their associated tracks, and to modify the tilt angle of the inversion table. In this embodiment, massage elements 112*a* and 112*b* are coupled to belts 501*a* and 501*b*, respectively, and motors may for example be housed near pulleys or sprockets 511*a* and 511*b* to drive the belts. A motor 502 may be coupled to a gear 503 to modify the tilt angle of the inversion table. Similar actuators may be used for other elements such as traction forces and neck massage elements.

Figure 6:
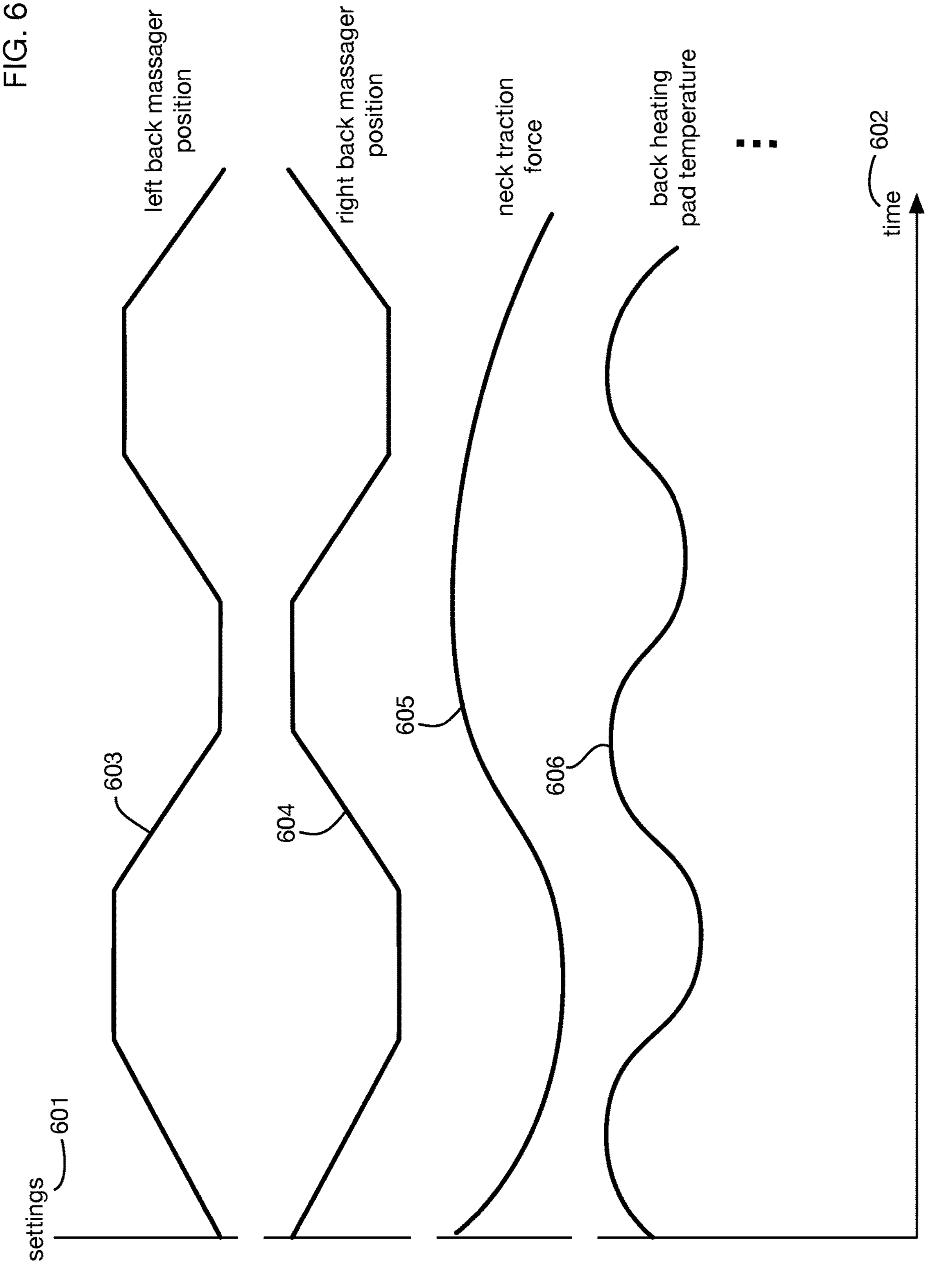
FIG. 6 shows settings output by an illustrative program that automatically controls the therapy elements incorporated into the embodiment of FIG. 1.

In one or more embodiments, the inversion table may include one or more stored programs that cycle the therapy elements through sequences of settings. Programs may for example be selectable or customizable by a user or therapist. One or more embodiments may expose an application programming interface that allows for additional programs to be developed or modified. FIG. 6 shows an illustrative sequence of settings that may for example be generated by a stored program that executes on the processor of the inversion table. Settings for one or more of the actuators may be modified over time, possibly in repeating patterns at any desired frequencies. Illustrative settings 601 over time 602 are shown for the up-down positions 603 and 604 of left and right back massagers, for the neck traction force 605, and for the temperature 606 of the back heating pad. Similar settings patterns may be applied to any of the inversion table's therapy elements. Patterns of any frequency and shape may be applied to any or all of the elements. In one or more embodiments, random variations in some or all of these patterns may also be applied via the stored programs, which may improve therapeutic effect in some situations.

Another illustrative program may for example modify the pitch angle of the inversion table over time. For example, one such program may set the pitch angle to −25 degrees for 70 seconds, then set the pitch angle to −35 degrees for 60 seconds, then set the pitch angle to −45 degrees for 50 seconds, then set the pitch angle to −55 degrees for 40 seconds, and then set the pitch angle to −65 degrees for 30 seconds. This program is illustrative; one or more embodiments may modify pitch angle or any other settings over time using any desired patterns.

Illustrative ranges or levels for settings of various elements of an illustrative embodiment of the invention are shown in the tables below. These values are illustrative and embodiments may modify or extend these levels and ranges as desired or required.

Head and Neck Assembly: Ranges or Levels

| | |
|---|---|
| Assembly Adjustment Range | 5-15 inches |
| Cervical Traction Tension Levels | 1-5 levels |
| Percussion Pad Contact Pressure | Soft, Medium, Hard |
| Percussion Pad Horizontal Travel Speeds | 1-3 inches/sec |
| Percussion Speed Frequency (pulses/sec) | 30, 60, 120, 240, 480 |
| Bi-Lateral Percussion Pad Travel Range | 1-5 inches |

Body and Center Assembly: Ranges or Levels

| | |
|---|---|
| Inversion Pitch Angle range | +50 to −65 degrees |
| Percussion Pad Contact Pressure | Soft, Medium, Hard |
| Percussion Speed Frequency (pulses/sec) | 30, 60, 120, 240, 480 |
| Bi-Lateral Percussion Pad Travel Range | 0-26 inches |
| Uni-Lateral Percussion Pad Travel Range | + or −13 inches |
| Percussion Pad Horizontal Travel Speeds | 3-6 inches/sec |
| Single Side (Let or Right Percussion Pad) | 0-26 inches |
| Adjustable Heating Pad (75-110 degree temp) | 1-3 levels |

Foot and Leg Assembly: Ranges or Levels

| | |
|---|---|
| Assembly Traction Travel Range (horizontal) | 0-30 inches |
| Telescopic Knee Range (vertical adjustment) | 0-14 inches |

While the invention herein disclosed has been described by means of specific embodiments and applications thereof, numerous modifications and variations could be made thereto by those skilled in the art without departing from the scope of the invention set forth in the claims.

What is claimed is:

1. A programmable multi-therapy inversion table, comprising:

a supporting frame;

a back rest rotatably coupled to said supporting frame and configured to support a back of a user, wherein said back rest comprises a superior end closest to a head of said user, and an inferior end closest to feet of said user;

wherein said back rest is configured to rotate between an upright position wherein said superior end is vertically higher than said inferior end, and an inverted position wherein said superior end is vertically lower than said inferior end;

one or more moving back massage elements moveably coupled to said back rest, each moving back massage element of said one or more moving back massage elements comprising a back vibrating element configured to apply vibration to said back of said user; and, a back massage element position actuator configured to move said back vibrating element along a track in or coupled to said back rest to position said back vibrating element at multiple locations of said back of said user;

a head and neck support coupled to said back rest, wherein said head and neck support comprises a planar surface along a horizontal axis; and, one or more moving neck massage elements moveably coupled to said head and neck support, each moving neck massage element of said one or more moving neck massage elements comprising a neck vibrating element configured to apply vibration to a neck of said user; and, a neck massage element position actuator configured to move said neck vibrating element along a track in or coupled to said head and neck support to position said neck vibrating element at multiple locations of said neck of said user, wherein said track, of each of said one or more moving neck massage elements, in or coupled to said head and neck support runs along a superior-to-inferior axis parallel to said horizontal axis;

wherein said track in or coupled to said head and neck support comprises a slot in said head and neck support, said one or more moving neck massage elements comprise two moving neck massage elements;

said track in or coupled to said head and neck support comprises a first track associated with a first moving neck massage element of said two moving neck massage elements and a second track associated with a second moving neck massage element of said two moving neck massage elements; and, the first track associated with said first moving neck massage element of said two moving neck massage elements is substantially parallel to the second track associated with said second moving neck massage element of said two moving neck massage elements; and, a processor configured to set or modify one or more settings of said back rest or said one or more moving back massage elements over time.

2. The programmable multi-therapy inversion table of claim 1, further comprising a table tilt actuator configured to rotate said back rest between said upright position and said inverted position.

3. The programmable multi-therapy inversion table of claim 1, wherein said track in or coupled to said back rest comprises a slot in said back rest.

4. The programmable multi-therapy inversion table of claim 1, wherein said track in or coupled to said back rest extends from a first position closest to said superior end to a second position closest to said inferior end.

5. The programmable multi-therapy inversion table of claim 1, wherein said one or more moving back massage elements comprise two moving back massage elements;

said track in or coupled to said back rest comprises a first track associated with a first moving back massage element of said two moving back massage elements and a second track associated with a second moving back massage element of said two moving back massage elements, and, the first track associated with said first moving back massage element of said two moving back massage elements is substantially parallel to the second track associated with said second moving back massage element of said two moving back massage elements.

6. The programmable multi-therapy inversion table of claim 1, wherein said back vibrating element of said each moving back massage element is further configured to rotate.

7. The programmable multi-therapy inversion table of claim 1, wherein said head and neck support comprises a neck traction actuator configured to move said head and neck support away from said back rest.

8. The programmable multi-therapy inversion table of claim 1, wherein said track in or coupled to said head and neck support extends from a first position closest to a superior end of said head and neck support to a second position closest to an inferior end of said head and neck support.

9. The programmable multi-therapy inversion table of claim 1, wherein said neck vibrating element of said each moving neck massage element is further configured to rotate.

10. The programmable multi-therapy inversion table of claim 1, further comprising a leg support coupled to said back rest.

11. The programmable multi-therapy inversion table of claim 1, further comprising a heating pad coupled to said back rest.

12. The programmable multi-therapy inversion table of claim 1, further comprising a stored program configured to execute on said processor to set or modify said one or more settings.

13. The programmable multi-therapy inversion table of claim 1, further comprising one or more gluteal vibration elements or one or more hamstring vibration elements or one or more gluteal vibration elements and one or more hamstring vibration elements.

14. The programmable multi-therapy inversion table of claim 10, further comprising a leg traction actuator configured to move said leg support away from said back rest.

15. The programmable multi-therapy inversion table of claim 1, wherein one or more of said back vibrating element of said each moving back massage element of said one or more moving back massage elements, and said neck vibrating element of said each moving neck massage element of said one or more moving neck massage elements, is configured to provide heat.

16. The programmable multi-therapy inversion table of claim 1, wherein said processor is further configured to set or modify a pitch angle of said programmable multi-therapy inversion table, such that said processor statically or dynamically adjust said pitch angle to a desired angle over a desired time period.

17. A programmable multi-therapy inversion table, comprising:

a supporting frame;

a back rest rotatably coupled to said supporting frame and configured to support a back of a user, wherein said back rest comprises a superior end closest to a head of said user, and an inferior end closest to feet of said user;

wherein said back rest is configured to rotate between an upright position wherein said superior end is vertically higher than said inferior end, and an inverted position wherein said superior end is vertically lower than said inferior end;

a table tilt actuator configured to rotate said back rest between said upright position and said inverted position;

one or more moving back massage elements moveably coupled to said back rest, each moving back massage element of said one or more moving back massage elements comprising a back vibrating element configured to apply vibration to said back of said user; and a back massage element position actuator configured to move said back vibrating element along a track in or coupled to said back rest to position said back vibrating element at multiple locations of said back of said user;

a head and neck support coupled to said back rest, wherein said head and neck support comprises a planar surface along a horizontal axis, comprising a neck traction actuator configured to move said head and neck support away from said back rest; and one or more moving neck massage elements moveably coupled to said head and neck support, each moving neck massage element of said one or more moving neck massage elements comprising a neck vibrating element configured to apply vibration to a neck of said user; and a neck massage element position actuator configured to move said neck vibrating element along a track in or coupled to said head and neck support to position said neck vibrating element at multiple locations of said neck of said user, wherein said track, of each of said one or more moving neck massage elements, in or coupled to said head and neck support runs along a superior-to-inferior axis parallel to said horizontal axis;

a leg support coupled to said back rest, comprising a leg traction actuator configured to move said leg support away from said back rest;

a heating pad coupled to said back rest;

a processor configured to set or modify one or more settings of one or more of said table tilt actuator over time in a pattern, said one or more moving back massage elements, said one or more moving neck massage elements, said neck traction actuator, said leg traction actuator, said heating pad; and, a stored program configured to execute on said processor to set or modify said one or more settings;

wherein said track in or coupled to said head and neck support comprises a slot in said head and neck support, said one or more moving neck massage elements comprise two moving neck massage elements; and, the track associated with a first moving neck massage element of said two moving neck massage elements is substantially parallel to the track associated with a second moving neck massage element of said two moving neck massage elements;

wherein one or more of said back vibrating element of said each moving back massage element of said one or more moving back massage elements, and said neck vibrating element of said each moving neck massage element of said one or more moving neck massage elements, is configured to provide heat;

wherein said stored program is further configured to execute on said processor to set or modify a pitch angle of said programmable multi-therapy inversion table, such that said stored program statically or dynamically adjust said pitch angle to a desired angle over a desired time period.

* * * * *